(12) United States Patent
Meyer et al.

(10) Patent No.: US 7,849,078 B2
(45) Date of Patent: Dec. 7, 2010

(54) GENERATING SEARCHABLE KEYWORDS

(75) Inventors: Marek Meyer, Schwalbach (DE); Andreas Faatz, Darmstadt (DE); Tomas Hildebrandt, Darmstadt (DE)

(73) Assignee: SAP AG, Walldorf (DE)

( * ) Notice: Subject to any disclaimer, the term of this patent is extended or adjusted under 35 U.S.C. 154(b) by 265 days.

(21) Appl. No.: 11/449,030

(22) Filed: Jun. 7, 2006

(65) Prior Publication Data
US 2007/0288451 A1   Dec. 13, 2007

(51) Int. Cl.
*G06F 7/00* (2006.01)
*G06F 15/18* (2006.01)
(52) U.S. Cl. .................. 707/723; 706/12; 706/47
(58) Field of Classification Search ............. 707/3, 707/5, 6, 723; 706/12, 47
See application file for complete search history.

(56) References Cited

U.S. PATENT DOCUMENTS

| | | | | |
|---|---|---|---|---|
| 6,377,945 | B1* | 4/2002 | Risvik | 707/3 |
| 6,460,034 | B1* | 10/2002 | Wical | 707/5 |
| 6,470,307 | B1* | 10/2002 | Turney | 704/9 |
| 2004/0141354 | A1* | 7/2004 | Carnahan | 365/145 |
| 2005/0028156 | A1* | 2/2005 | Hammond et al. | 718/100 |
| 2005/0192792 | A1* | 9/2005 | Carus et al. | 704/2 |
| 2005/0192955 | A1* | 9/2005 | Farrell | 707/5 |
| 2005/0210383 | A1* | 9/2005 | Cucerzan et al. | 715/533 |
| 2006/0010126 | A1* | 1/2006 | Anick et al. | 707/4 |
| 2006/0080314 | A1* | 4/2006 | Hubert et al. | 707/5 |
| 2006/0095852 | A1* | 5/2006 | Trepess et al. | 715/741 |
| 2006/0230033 | A1* | 10/2006 | Halevy et al. | 707/3 |

OTHER PUBLICATIONS

Ehrig et al. "Ontology Mapping-An Integrated Approach", Apr. 21, 2004.*
'A Comparative Study for Domain Ontology Guided Feature Extraction' [online]. Wang et al., 2003, [retrieved on Jun. 20, 2006]. Retrieved from the Internet. <URL:www.crpit.com/confpapers/CRPITV16BWang.pdf>, 10 pages.
'Finding Advertising Keywords on Web Pages' [online]. Wen-Tau Yih et el., 2006, [retrieved on Jun. 20, 2006]. Retrieved from the Internet: <URL:www.cs.cmu.edu/~vitor/papers/www06.pdf>, 10 pages.
'GIRT and the Use of Subject Metadata for Retrieval' [online]. Petras, 2004, [retrieved on Jun. 20, 2006]. Retrieved from the Internet: <URL: www.clef-campaign.org/2004/working_notes/Working Notes2004/28.pdf>, 7 pages.
Cohn and Hofmann, "The Missing Link: A Probabilistic Model of Document Content and Hypertext Connectivity," *Advances in Neural Information Processing Systems (NIPS*13)*, MIT Press 2001, 7 pages.

(Continued)

*Primary Examiner*—Apu M Mofiz
*Assistant Examiner*—Cindy Nguyen
(74) *Attorney, Agent, or Firm*—Fish & Richardson P.C.

(57) ABSTRACT

Generating searchable keywords includes obtaining sets of parameters that include weights, where the weights correspond to actions for changing first words into predicted keywords, using the sets of parameters to obtain predicted keywords from the first words, determining a prediction value for each set of parameters, where the prediction values are based on an extent to which predicted keywords for a set of parameters match predefined keywords, ranking the sets of parameters based on prediction values, and applying a selected set of parameters to a second word to obtain a new keyword, wherein the selected set of parameters is applied based on rank.

20 Claims, 8 Drawing Sheets

OTHER PUBLICATIONS

'Ein Verfahren zur Anreicherung fachgeblesspezifischer Ontologien durch Begriffsvorschlage' [online]. Andreas Faatz, 2004 [retrieved on Jun. 20, 2006]. Retrieved from the Internet: <URL: www.kom.e-technik.tu-darmstadt.de/publications/abstracts/Faa04-1.html>, 2 pages.

Faatz and Steinmetz,"An Evaluation Framework for Ontology Enrichment," *Ontology Learning from Text: Methods, Evaluation and Applications*, IOS Press, 2005, pp. 77-91.

'Author-generated Dublin Core Metadata for Web Resources: A Baseline Study in an Organization' [online]. Greenberg et al., 2001 [retrieved on Jun. 20, 2006]. Retrieved from the Internet: <URL:www.jodi.ecs.soton.ac.uk/Articles/v02/i02/Greenberg>, 13 pages.

'Context for Semantic Matadata' [online]. Kenneth Haase, 2004, [retrieved on Jul. 24, 2006]. Retrieved from the Internet: <URL: delivery.acm.org/10.1145/1030000/1027574/p204-haase.pdf?key1=1027574&key2=1952573511&coll=ACM&dl=ACM&CFID=15151515&CFTOKEN=6184618>, 8 pages.

'Building Structures of Reusable Educational Content Based on LOM' [online]. Hoermann et al., 2003, [retrieved on Jun. 20, 2006]. Retrieved from the Internet: <URL: www.sunsite.informatik.rwthaachen.de/Publications/CEUR-WS/Vol-75/files/SW_WL_04.pdf>, pp. 234-243.

Hoermann et al, "ResourceCenter—A Digital Learning Object Repository with an Integrated Authoring Tool Set," *World Conference on Educational Multimedia, Hypermedia & Telecommunications, ED-MEDIA 2005-17$^{th}$*, Montreal, Canada, vol. 5, pp. 3453-3460.

'The Actual Use of Metadata in Ariadne: An Empirical Analysis' [online]. Najjar et al., 2003, [retrieved on Jun. 20, 2006]. Retrieved from the Internet: <URL: www.cs/kuleuven.ac.be/~najjar/papers/EmpiricalAnalysis_ARIADNE2003.pdf>, 6 pages.

Salton, "Automatic Term Class Construction Using Relevance—A Summary of Work in Automatic Pseudoclassification," *Information Processing & Management*, Great Britain, 1980, vol. 16, pp. 1-15.

Heylighen, C., "Cybernetics and Second-Order Cybernetics", Encyclopedia of Physical Science and Technology (2001).

Levenshtein, V., "Binary codes capable of correcting deletions, insertions and reversals", Soviet Physics Doklady, vol. 10(8), (1966), pp. 707-710.

Oracle9i Database Online Documentation, Release 2 (9.2), [online] Retrieved from the Internet:<URL:http//www.> [retrieved on xxxx-xx-xx].

Ukkonen, E., "On approximate String Matching", Proc. Int'l Conf. on Foundations of Comp. Theory, Springer-Verlag, LNCS (1983), pp. 487-495.

Cruse et al., Lexical Semantics, Cambridge Univ. Press, Cambridge, England (2001).

Gomez-Perez, A. et al., Ontological Engineering, Springer-Verlag London Ltd. (2004).

Manning et al., Foundations of Statistical Natural Language Processing, MIT Press, Cambridge, Massachusetts (1999).

Motulsky, H., Intuitive Biostatistics, Oxford Univ. Press (1995).

\* cited by examiner

GENERATING SEARCHABLE KEYWORDS

TECHNICAL FIELD

This patent application relates generally to generating searchable keywords.

BACKGROUND

Documents (and other data-bearing items) often contain embedded metadata Learning objects metadata (LOM) is a particular type of metadata that serves as a structured description of learning objects including, e.g., text, Web pages, graphical elements, video, animation, and interactive tests. Metadata, including LOM, is typically searchable. For example, a user may input one or more keywords into a searching application. The searching application compares the input keywords to keywords stored in the metadata, and retrieves document(s) (or other information-bearing item) that contain keywords that match, or are closest to, the input keywords. In the case of LOM, for example, the searching application may retrieve a learning object.

SUMMARY

This patent application describes methods and apparatus, including computer program products, for generating searchable keywords.

Processes for generating searchable keywords may include obtaining sets of parameters comprising weights, where the weights correspond to actions for changing first words into predicted keywords, using the sets of parameters to obtain predicted keywords from the first words, determining a prediction value for each set of parameters, where the prediction values are based on an extent to which predicted keywords for a set of parameters match predefined keywords, ranking the sets of parameters based on prediction values, and applying a selected set of parameters to a second word to obtain a new keyword, where the selected set of parameters is applied based on rank.

The selected set of parameters may have a prediction value that indicates a best match between predicted keywords and predefined keywords. The prediction value may be determined for plural predicted keywords. The plural predicted keywords may correspond to keywords that are related to the first word hierarchically.

The processes for generating searchable keywords may also include receiving feedback indicating whether the new keyword is acceptable and, if the new keyword is not acceptable, applying another set of parameters to the second word to obtain an additional keyword. The other set of parameters may have a prediction value that indicates a next best match between predicted keywords and predefined keywords.

The weights may include costs assigned to actions required to change the first words into the predicted keywords, where the actions comprise character transitions. The character transitions may comprise one or more of: deleting an end position character, deleting a middle position character, deleting a beginning position character, editing the end position character, editing a middle position character, editing the beginning position character, inserting the end position character, inserting a middle position character, and inserting the beginning position character. The end position may comprise a last character position in the first word, the beginning position may comprise a first character position in the first word, and a middle position may comprise a position in the first word between the end position and the beginning position. A weight for a set of parameters may be based on whether a first word is part of a title of data or a body of the data.

The new keyword may be part of metadata for a learning object, and the learning object may be stored in a repository that is part of an electronic learning system. The process for generating searchable keywords may also include storing the new keyword as metadata for a data object, receiving a search query, and returning information relating to the data object if at least part of the search query matches the new keyword.

In the process for generating searchable keywords, the first words may be obtained by removing stop words from text that includes the first words. The feedback may be received from a user, and the process may further comprise receiving feedback indicating whether the additional is acceptable, and if the additional keyword is not acceptable, applying another set of parameters to the second word to obtain a next keyword. Receiving and applying may be repeated until an acceptable keyword is obtained.

The details of one or more examples are set forth in the accompanying drawings and the description below. Further features, aspects, and advantages of the invention will become apparent from the description, the drawings, and the claims.

DESCRIPTION OF THE DRAWINGS

Like reference numerals in different figures indicate like elements.

DETAILED DESCRIPTION

Figure 1A:
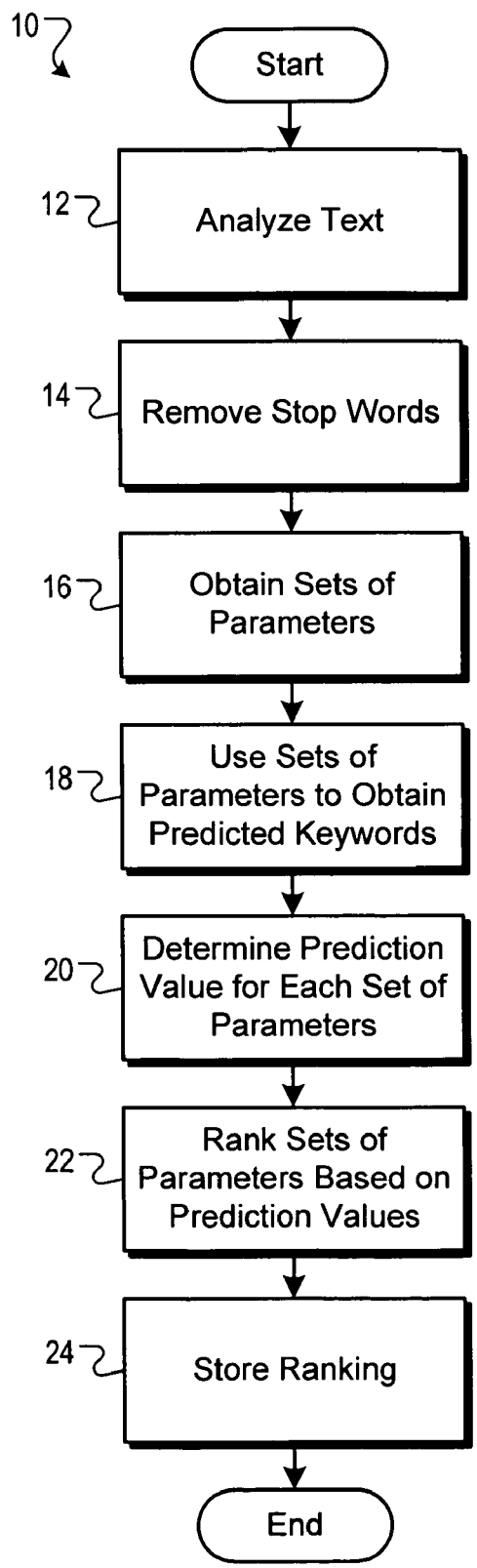
FIG. 1A is an example of a process for ranking sets of parameters used to obtain keywords.

FIG. 1A is an example of a process 10 for ranking sets of parameters ("subsystems") used to obtain keywords. The ranking of the sets of parameters may be considered a training phase. Keywords generated during the training phase are compared to pre-existing keywords to rank the sets of parameters used to obtain the keywords. The keywords are generated from existing information, such as natural language text, by modifying characters in words in the existing information until a match is made with a keyword chosen from a vocabulary of predefined keywords. The predefined keyword vocabulary includes a list of possible keywords that are applicable to the information being analyzed. For example, the vocabulary may be a taxonomy or an ontology.

The ranked sets of parameters are then used during a runtime phase to generate new keywords for other existing information that does not have pre-existing keywords. The existing information may include metadata, such as a title or a description (e.g., abstract). In certain implementations, the metadata is associated with items such as learning objects, documents, images, or video. The keywords generated may, for example, allow a user to search these items. The learning object metadata (LOM) may follow a standard format, such as the standard defined by the Learning Technology Committee of the Institute of Electrical and Electronics Engineers, Inc. (IEEE) in their standard designated 1484.12.1. For example, the title, description, and keywords may be organized in structures, such as LOM.general.title, LOM.general.description, and LOM.general.keywords, respectively.

The training phase may be performed by process 10. The ranked sets of parameters generated during the training phase by process 10 will be used in a runtime phase to generate new keywords. Process 10 may be implemented on a computer system.

Process 10 analyzes (12) selected text. The analysis may include identifying components as described above, such as a title and a description (e.g., an abstract). The components may be in the form of metadata associated with an item, such as a learning object, a document, an image, or video. The text may be expressed in a natural language format. For example, a title of a learning object may include, "How to create a new presentation." A description associated with the title may include, "Select the New button or the New command from the File menu."

Process 10 removes (14) "stop words" from the text being analyzed. For example, the text may include articles, such as "the" and "a," or pronouns, such as "he" and "she," which do not have associated keywords in the keyword vocabulary and, are therefore not used for generating keywords. The stop words include a list of words to be removed from the text. The removal of stop words may be governed by one or more rules, such as remove all articles or remove all pronouns. For example, the list of stop words may include the words "to," "a," and "the" included in the title and description example above. Occurrences of "to," "a," and "the" are then ignored when processing the words in the title and description to obtain keywords in the method described below.

Process 10 obtains (16) a set of parameters. A set of parameters is used in determining how words in the text will be translated into keywords from the predefined keyword vocabulary. In the example, the keyword vocabulary is a controlled language, as apposed to the text which may be natural language. For example, the United States Library of Congress Subject Headings may be used as a keyword vocabulary. Each set of parameters also contains weighting information ("costs"), as described below, to rate the success of the keywords generated using a particular set of parameters.

The actions used to transform a word in the text into a keyword, such as adding, removing, or editing (e.g., substituting) a character, may be rated using Levenshtein or edit distances. The Levenshtein distance or edit distance between a word and a keyword is given by the minimum number of operations needed to transform the word into the keyword, where an operation is an insertion, deletion, or substitution of a single character. A low edit distance indicates a close match between a text word and a keyword, while a high edit distance indicates a distant or rough match. For example, if the text contains the word "kitten" and the keyword vocabulary contains the word "sitting," then the edit distance between the text word and the keyword is three, including one for a substitution of "k" with "s," one for a substitution of "e" with "i," and one for the addition of "g" to the end. In addition, each action (i.e., adding, removing, and substituting) may be weighted so that additions, for example, result in a higher edit distance than substitutions. For example, each action may be multiplied by a weight chosen from the interval from zero to one ([0;1]).

Further, the location within the text word where the action occurs may be weighted. For example, a particular vocabulary may include keywords that could have suffixes when used in the natural language context of the text words, but they do not include suffixes within the vocabulary. Removing characters from the end of text words, including the suffixes, may result in a good keyword match even though the edit distance is not low. In this case, a weighting that lowers the edit distance of removing characters from the end of a text word may increase the success of keyword generation. The locations may be defined by a fixed number of characters, such as beginning, ending, and middle portions defined by a first character, a last character, and characters in between the first and the last, respectively. For example, character transitions may include one or more of: deleting an end position character, deleting a middle position character, deleting a beginning position character, editing the end position character, editing a middle position character, editing the beginning position character, inserting the end position character, inserting a middle position character, and inserting the beginning position character The following table shows an example of a set of parameters associated with three character actions and three word locations.

TABLE 1

|           | Add | Remove | Substitute |
|-----------|-----|--------|------------|
| Beginning | 0.5 | 1      | 1          |
| Middle    | 1   | 1      | 1          |
| End       | 1   | 0.2    | 1          |

The set of parameters shown in Table 1 has low costs associated with adding characters to the beginning of a text word (i.e., edit distance of 0.5) or removing characters from the end of a text word (i.e., edit distance of 0.2). Each addition of a character performed in the beginning portion of a text word represents half of a full edit distance unit. Each removal of a character from the end portion of a text word represents one fifth of the full edit distance unit. The seven other action and location combinations carry a full weight (i.e., edit distance of 1). Another set of parameters may have different costs associated with one or more of the nine action and location combinations. The costs (e.g., weights) may be generated randomly. Alternatively, cost values may be generated manually or through a combination of manual and automatic processes.

In addition to parameters for weights of character actions at particular word locations, the sets of parameters may include other weights. Keyword generation may be weighted based on whether a text word under consideration originated from a title portion of the metadata or a description portion of the metadata. The title and description weighting factors may be represented by two numbers, respectively, in the range from zero to one. For example, the title portion of the metadata may contain more accurate text words or words that more completely exemplify the subject matter than words in the description. In this situation, the edit distance for a keyword generated from the description may be shorter (i.e., a closer match) than a keyword generated from the title, but a stronger weighting of keywords from the title portion may produce an overall result favoring the keyword from the title.

The keywords in the vocabulary may be organized in a hierarchy. For example, a keyword of "apple" may have a parent keyword of "fruit" and a child keyword of "seed." A number of levels below or above a generated keyword may be defined from which to obtain additional keywords. The hierarchy may be defined in the keyword vocabulary. In this example, a text word of "apples" may result in a generated keyword of "apple." If one level above and one level below "apple" are retrieved from the vocabulary hierarchy, then "fruit" and "seed" are also determined to be possible keywords. Each hierarchy level may be assigned a weight in a method similar to the metadata portions and word transformation actions described above.

The keywords may also be weighted according to the number of keywords generated for a particular text word. For example, the three keywords with the shortest edit distance may be generated for each text word and each of the three keywords may have a corresponding weighting factor.

The number of sets of parameters may be given by:

$$N_S = N_H \times N_K \times N_C \times 10 N_{TD}$$

where $N_S$ is the number of sets of parameters, $N_H$ is the number of hierarchical levels chosen, $N_K$ is the number of keywords chosen for each text word, $N_C$ is the number of sets of costs chosen for the actions at each location within a word, and $N_{TD}$ is the number of pairs of title and description weighting factors.

The keyword with the shortest weighted edit distance resulting from all word transformations within a particular metadata item, which may include portions such as a title and a description, may be chosen as the keyword to represent the metadata item. In other implementations, more than one keyword may be chosen. For example, a predefined number of keywords may be chosen and/or keywords meeting one or more edit distance criteria may be chosen.

Process 10 obtains (18) predicted keywords using the sets of parameters. As described above, the sets of parameters, including the randomly/manually generated weights, are used to predict keywords. For example, one set of parameters may result in the text word "apples" having a keyword "apple" with a shortest edit distance. A second set of parameters may favor addition of characters over removal resulting in a keyword of "applesauce" having the shortest edit distance for the same text word "apples." While a third set of parameters may favor words in a different portion of the metadata item, such as the title, resulting in a keyword unrelated to the text word "apples." One or more keywords may be determined for each metadata item. In general, edit distances may be calculated between each remaining word in, for example, LOM.general.title/description and each entry in the vocabulary.

Process 10 determines (20) a prediction value ("evaluating mean value") for each of the sets of parameters. The prediction value expresses the quality of the predicted keywords generated by its associated set of parameters. In order to generate a prediction value, the predicted keywords for each set of parameters and metadata item are compared to pre-existing keywords for each of the metadata items. An average prediction value is determined for each set of parameters over the prediction values for each metadata item.

The average prediction value (also referred to as the "prediction mean value") may be a precision value, a recall value, or a combination of the two (e.g., an average of the two, a maximum of the two, a minimum of the two, or the like). In this context, a precision value is a number of predicted keywords that are also in the predefined keyword vocabulary relative to the total number of predicted keywords. The recall value is the number of keywords in the predefined keyword vocabulary that are also in the predicted keywords relative to the total number of keywords in the predefined keyword vocabulary. By way of example, the predicted keywords (in total) may include "see", "sea", and "three", and the predefined keyword vocabulary may include (in total) "see", "fly", "high", and "sea". In this example, the precision value is 0.66 (i.e., 2÷3) and the recall value is 0.50 (i.e., 2÷4). Either of these prediction values, or others, may be used in this implementation.

Process 10 ranks (22) the sets of parameters based on the average prediction values for the sets of parameters. The highest (i.e., most accurate) average prediction value may be determined using non-parametric statistical significance tests such as a Friedman test and a paired Wilcoxon text. A Friedman test is a test that reduces false positives that occur when statistical tests are used repeatedly and is similar to parametric analysis of variance (ANOVA). The Wilcoxon signed-rank test is a non-parametric test for the case of two related samples or repeated measurements on a single sample. The Wilcoxon test involves comparisons of differences between measurements, so it requires that the data be measured at an interval level of measurement. However, the Wilcoxon test does not require assumptions about the form of the distribution of the measurements.

Process 10 stores (24) the rankings. The rankings are stored for use during a runtime phase. For example, the rankings may be used when predicting keywords for metadata items that do not have pre-existing keywords, such as new metadata items added to a system. The use of the stored rankings will be described below with respect to FIG. 1B.

Figure 1B:
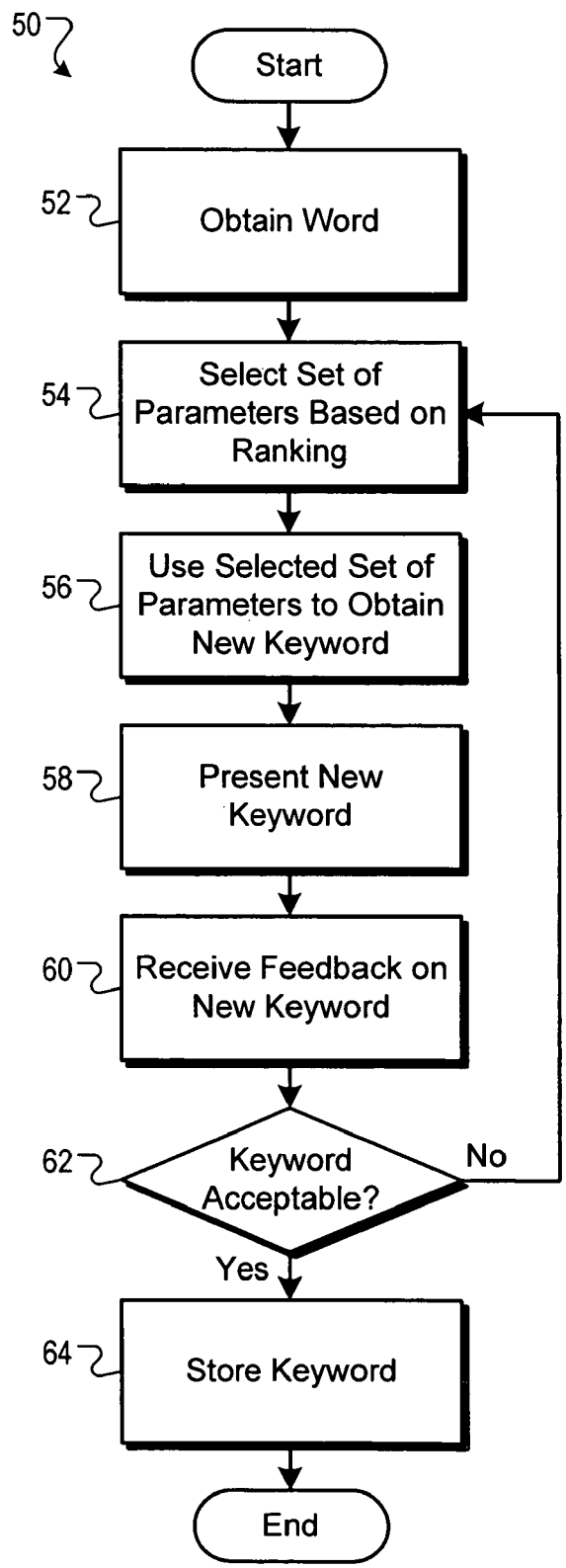
FIG. 1B is an example of a process for obtaining keywords.

FIG. 1B is an example of a process 50 for obtaining keywords during a runtime phase using sets of parameters obtained during a training phase. In general, sets of parameters, ranked during the training phase of the keyword generator, are applied to text information based on the ranking to obtain keywords. The process 50 may be implemented on a computer system to perform the runtime phase. The process 50 obtains (52) a word from a text under consideration. For example, the word may be retrieved from metadata such as a title or description.

The process 50 selects (54) a set of parameters based on rankings of sets of parameters. For example, the rankings may be based on prediction values generated during the training phase, as described above with respect to FIG. 1A. The selected set of parameters may represent the set of parameters having the best ranking and, therefore, the most likely set of parameters to generate accurate keywords.

The process 50 obtains (56) new keywords using the selected set of parameters. The keywords may be obtained in the same manner as the keyword predictions described with respect to FIG. 1A. Character actions are applied to the obtained word, such as adding, removing, or substituting a character in the obtained word to generate a keyword from a keyword vocabulary. Weights are used to determine the most likely keyword from the generated keywords.

The process 50 presents (58) a new keyword. The most likely keyword is presented to a user for review. For example, the process 50 may present the new keyword in a graphical user interface (GUI) (not shown).

The process 50 receives (60) feedback regarding the new keyword. The feedback may be the result of a user review of a suggested new keyword. The feedback may include an acceptance or rejection of the suggested new keyword via the GUI.

If the feedback indicates (62) that the new keyword is not acceptable, then the process 50 selects (54) another set of parameters based on the rankings. For example, the process 50 may select the next highest ranked set of parameters as determined by the matching between the predicted keywords and the predefined keywords during the training phase. If the keyword is acceptable, then the process 50 stores (64) the new keyword. The stored keyword may then be used, for example, as a search criterion when searching for items of the type associated with the keyword. The process of suggesting keywords and receiving feedback may continue until the keywords are deemed acceptable.

The processes described herein including, but not limited to, processes 10 and 50 (hereinafter referred to collectively as "the processes") may find applicability in any computing or processing environment. The processes may be implemented using hardware, software, or a combination thereof. The processes are not limited to use with the hardware and software described herein; they may find applicability in any computing, processing or networking environment and with any type of machine that is capable of executing machine-readable instructions.

The processes may be implemented using digital electronic circuitry, or in computer hardware, firmware, software, or in combinations thereof. The processes can be implemented via a computer program product, i.e., a computer program tangibly embodied in an information carrier, e.g., in one or more machine-readable storage devices/media, for execution by, or to control the operation of, one or more data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Actions performed by the processes can be performed by one or more programmable processors executing one or more computer programs to perform the functions of the processes. The actions can also be performed by, and the processes can be implemented via, special purpose logic circuitry, e.g., one or more FPGAs (field programmable gate array) or ASICs (application-specific integrated circuit).

Processors suitable for execution of a computer program include, e.g., both general and special purpose microprocessors, and any one or more processors of any kind of digital computer. Generally, a processor will receive instructions and data from a read-only memory or a random access memory or both. Elements of a computer include a processor for executing instructions and one or more memory devices for storing instructions and data. Generally, a computer will also include, or be operatively coupled to receive data from, or transfer data to, or both, one or more mass storage devices for storing data, e.g., magnetic, magneto-optical disks, or optical disks. Information carriers suitable for embodying computer program instructions and data include all forms of non-volatile memory, including by way of example, semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

The processes can be implemented via a computing system that includes one or more back-end components, e.g., a data server, or that includes one or more middleware components, e.g., an application server, or that includes one or more front-end components, e.g., a client computer. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on respective computers and having a client-server relationship to each other.

The processing described herein may be performed in a different order and/or portions thereof may be omitted. As such, operations performed in furtherance of the processes are not limited to the flows described herein.

In one implementation, the keywords are associated with knowledge items within an electronic learning (e-learning) system and the keywords may be used to locate the knowledge items within the e-learning system. That is, process 10 may be used to rank sets of parameters and the process 50 may use the ranked sets of parameters to obtain keywords for use in the e-learning system. A description of an e-learning system in which the keywords may be used is set forth below.

E-Learning System

The e-learning system and methodology structures content so that the content is reusable and flexible. For example, the content structure allows the creator of a course to reuse existing content to create new or additional courses. In addition, the content structure provides flexible content delivery that may be adapted to the learning styles of different learners.

Figure 1C:
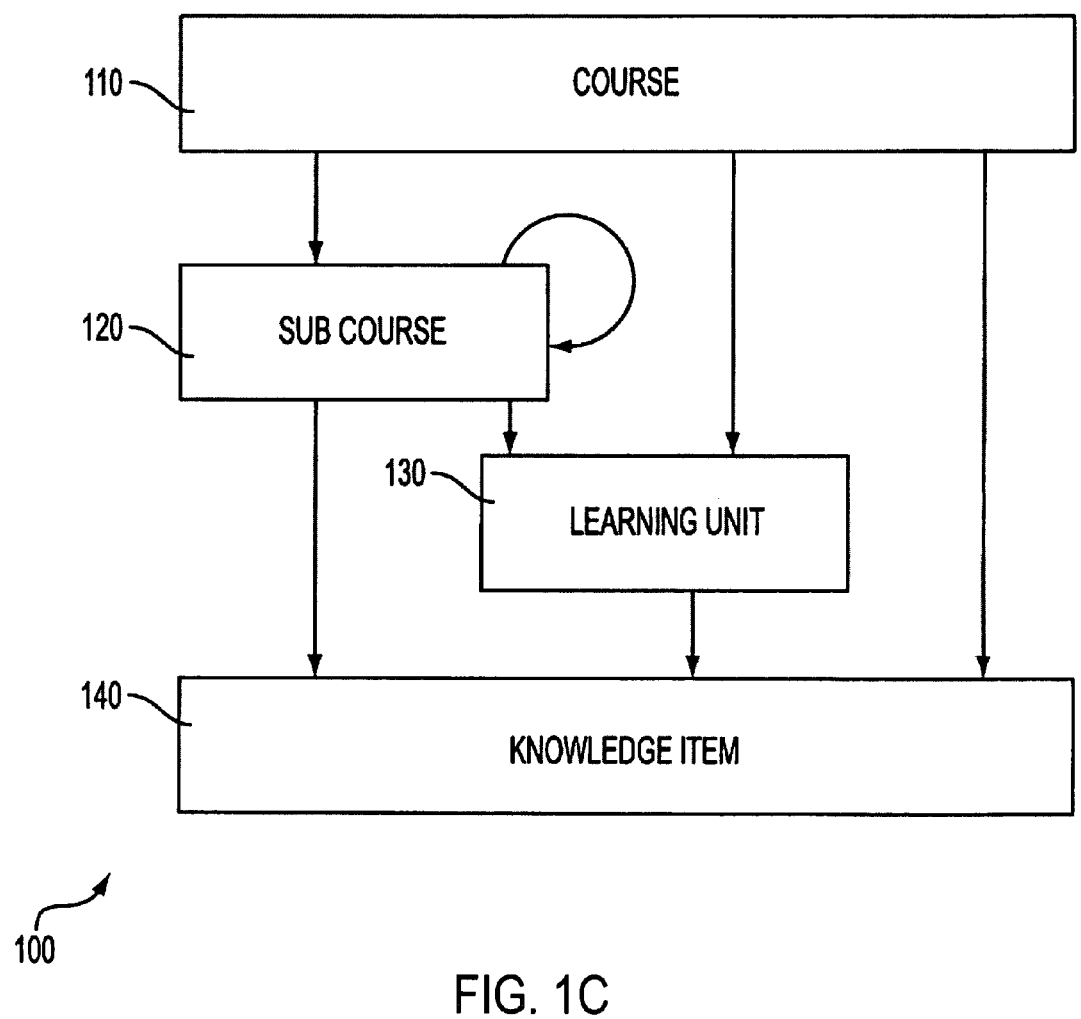
FIG. 1C is an example of a content aggregation model.

E-learning content may be aggregated using a number of structural elements arranged at different aggregation levels. Each higher level structural element may refer to any instances of all structural elements of a lower level. At its lowest level, a structural element refers to content and may not be further divided. According to one implementation shown in FIG. 1C, course material 100 may be divided into four structural elements: a course 110, a sub-course 120, a learning unit 130, and a knowledge item 140.

Starting from the lowest level, knowledge items 140 are the basis for the other structural elements and are the building blocks of the course content structure. Each knowledge item 140 may include content that illustrates, explains, practices, or tests an aspect of a thematic area or topic. Knowledge items 140 typically are small in size (i.e., of short duration, e.g., approximately five minutes or less).

A number of attributes may be used to describe a knowledge item 140, such as, for example, a name, a type of media, keywords, and a type of knowledge. In certain implementations, the attributes form metadata associated with the knowledge item 140. The name and/or keywords may be used by a learning system to identify and locate the content associated with a knowledge item 140. The type of media describes the form of the content that is associated with the knowledge item 140. For example, media types include a presentation type, a communication type, and an interactive type. A presentation media type may include a text, a table, an illustration, a graphic, an image, an animation, an audio clip, and a video clip. A communication media type may include a chat session, a group (e.g., a newsgroup, a team, a class, and a group of peers), an email, a short message service (SMS), and an instant message. An interactive media type may include a computer based training, a simulation, and a test.

A knowledge item 140 also may be described by the attribute of knowledge type. For example, knowledge types include knowledge of orientation, knowledge of action, knowledge of explanation, and knowledge of source/reference. Knowledge types may differ in learning goal and content. For example, knowledge of orientation offers a point of reference to the learner, and, therefore, provides general information for a better understanding of the structure of interrelated structural elements. Each of the knowledge types is described in further detail below.

Knowledge items 140 may be generated using a wide range of technologies, however, a browser (including plug-in applications) should be able to interpret and display the appropriate file formats associated with each knowledge item. For example, markup languages (such as a Hypertext Markup language (HTML), a standard generalized markup language (SGML), a dynamic HTML (DHTML), or an extensible markup language (XML)), JavaScript (a client-side scripting language), and/or Flash may be used to create knowledge items 140.

HTML may be used to describe the logical elements and presentation of a document, such as, for example, text, headings, paragraphs, lists, tables, or image references.

Flash may be used as a file format for Flash movies and as a plug-in for playing Flash files in a browser. For example, Flash movies using vector and bitmap graphics, animations, transparencies, transitions, MP3 audio files, input forms, and interactions may be used. In addition, Flash allows a pixel-precise positioning of graphical elements to generate impressive and interactive applications for presentation of course material to a learner.

Learning units 130 may be assembled using one or more knowledge items 140 to represent, for example, a distinct, thematically-coherent unit. Consequently, learning units 130 may be considered containers for knowledge items 140 of the same topic. Learning units 130 also may be considered relatively small in size (i.e., duration) though larger than a knowledge item 140.

Sub-courses 120 may be assembled using other sub-courses 120, learning units 130, and/or knowledge items 140. The sub-course 120 may be used to split up an extensive course into several smaller subordinate courses. Sub-courses 120 may be used to build an arbitrarily deep nested structure by referring to other sub-courses 120.

Courses may be assembled from the entire subordinate structural elements including sub-courses 120, learning units 130, and knowledge items 140. To foster maximum reuse, all structural elements should be self-contained and context free. Here, the courses, sub-courses 120, learning units 130, and knowledge items 140 form the hierarchical levels, which may be weighted when determining keywords.

Structural elements also may be tagged with metadata that is used to support adaptive delivery, reusability, and search/retrieval of content associated with the structural elements. For example, learning object metadata (LOM) defined by the IEEE "Learning Object Metadata Working Group" may be attached to individual course structure elements. The metadata may be used to indicate learner competencies associated with the structural elements. Other metadata may include a number of knowledge types (e.g., orientation, action, explanation, and resources) that may be used to categorize structural elements.

Figure 2:
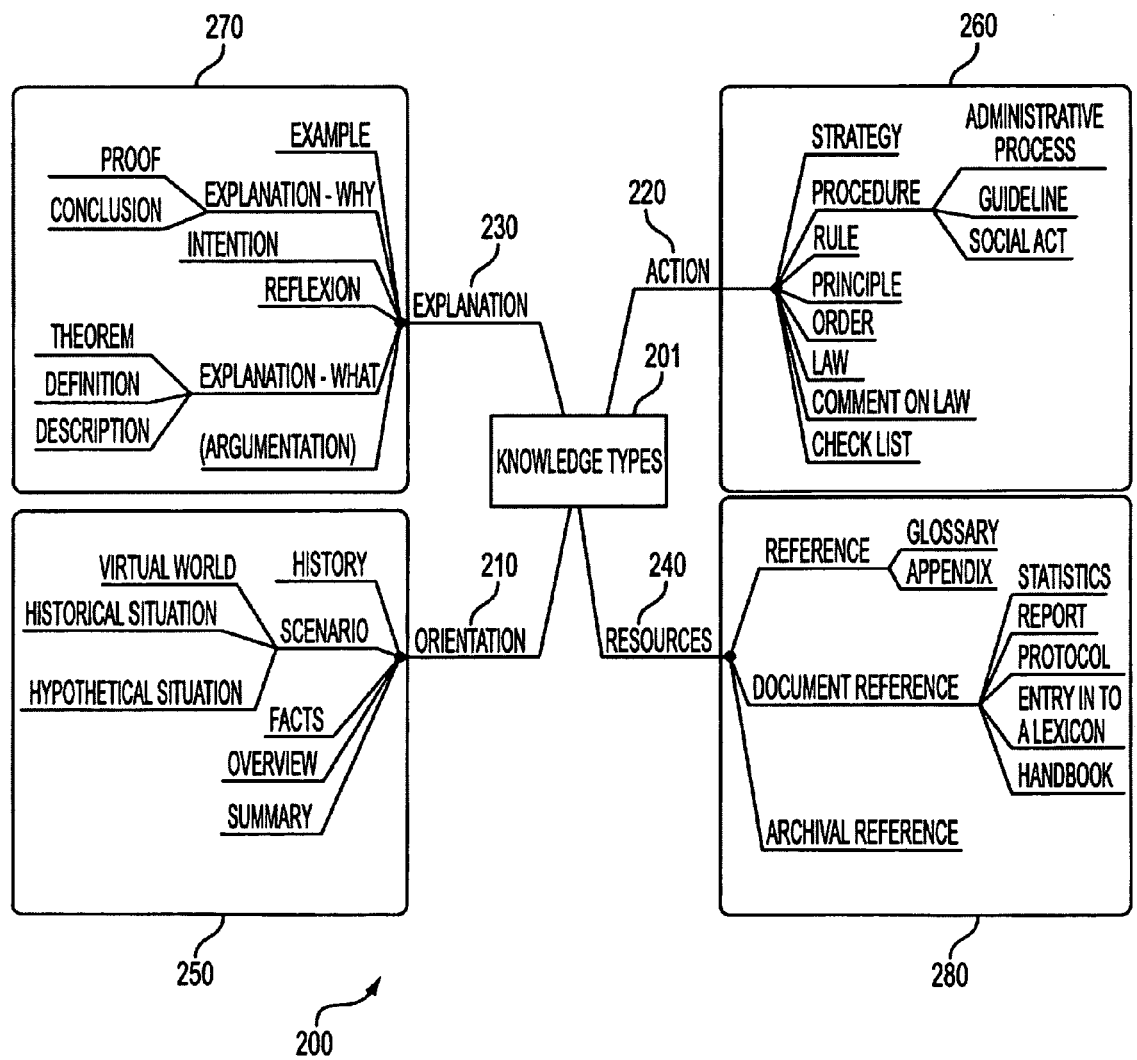
FIG. 2 is an example of an ontology of knowledge types.

As shown in FIG. 2, structural elements may be categorized using a didactical ontology 200 of knowledge types 201 that includes orientation knowledge 210, action knowledge 220, explanation knowledge 230, and reference knowledge 240. Orientation knowledge 210 helps a learner to find their way through a topic without being able to act in a topic-specific manner and may be referred to as "know what." Action knowledge 220 helps a learner to acquire topic related skills and may be referred to as "know how." Explanation knowledge 230 provides a learner with an explanation of why something is the way it is and may be referred to as "know why." Reference knowledge 240 teaches a learner where to find additional information on a specific topic and may be referred to as "know where."

The four knowledge types (orientation, action, explanation, and reference) may be further divided into a fine grained ontology as shown in FIG. 2. For example, orientation knowledge 210 may refer to sub-types 250 that include a history, a scenario, a fact, an overview, and a summary. Action knowledge 220 may refer to sub-types 260 that include a strategy, a procedure, a rule, a principle, an order, a law, a comment on law, and a checklist. Explanation knowledge 230 may refer to sub-types 270 that include an example, an intention, a reflection, an explanation of why or what, and an argumentation. Resource knowledge 240 may refer to sub-types 280 that include a reference, a document reference, and an archival reference.

Dependencies between structural elements may be described by relations when assembling the structural elements at one aggregation level. A relation may be used to describe the natural, subject-taxonomic relation between the structural elements. A relation may be directional or non-directional. A directional relation may be used to indicate that the relation between structural elements is true only in one direction. Directional relations should be followed. Relations may be divided into two categories: subject-taxonomic and non-subject taxonomic.

Subject-taxonomic relations may be further divided into hierarchical relations and associative relations. Hierarchical relations may be used to express a relation between structural elements that have a relation of subordination or superordination. For example, a hierarchical relation between the knowledge items A and B exists if B is part of A. Hierarchical relations may be divided into two categories: the part/whole relation (i.e., "has part") and the abstraction relation (i.e., "generalizes"). For example, the part/whole relation "A has part B," describes that B is part of A. The abstraction relation "A generalizes B" implies that B is a specific type of A (e.g., an aircraft generalizes a jet or a jet is a specific type of aircraft).

Associative relations may be used refer to a kind of relation of relevancy between two structural elements. Associative relations may help a learner obtain a better understanding of facts associated with the structural elements. Associative relations describe a manifold relation between two structural elements and are mainly directional (i.e., the relation between structural elements is true only in one direction). Examples of associative relations include "determines," "side-by-side," "alternative to," "opposite to," "precedes," "context of," "process of," "values," "means of," and "affinity."

The "determines" relation describes a deterministic correlation between A and B (e.g., B causally depends on A). The "side-by-side" relation may be viewed from a spatial, conceptual, theoretical, or ontological perspective (e.g., A side-by-side with B is valid if both knowledge objects are part of a superordinate whole). The side-by-side relation may be subdivided into relations, such as "similar to," "alternative to," and "analogous to." The "opposite to" relation implies that two structural elements are opposite in reference to at least one quality. The "precedes" relation describes a temporal relationship of succession (e.g., A occurs in time before B (and not that A is a prerequisite of B)). The "context of" relation describes the factual and situational relationship on a basis of which one of the related structural elements may be derived. An "affinity" between structural elements suggests that there is a close functional correlation between the structural elements (e.g., there is an affinity between books and the act of reading because reading is the main function of books).

Non Subject-Taxonomic relations may include the relations "prerequisite of" and "belongs to." The "prerequisite of" and the "belongs to" relations do not refer to the subject-taxonomic interrelations of the knowledge to be imparted. Instead, these relations refer to the progression of the course in the learning environment (e.g., as the learner traverses the course). The "prerequisite of" relation is directional whereas the "belongs to" relation is non-directional. Both relations may be used for knowledge items 140 that cannot be further subdivided. For example, if the size of the screen is too small to display the entire content on one page, the page displaying the content may be split into two pages that are connected by the relation "prerequisite of."

Another type of metadata is competencies. Competencies may be assigned to structural elements, such as, for example, a sub-course 120 or a learning unit 130. The competencies may be used to indicate and evaluate the performance of a learner as the learner traverse the course material. A competency may be classified as a cognitive skill, an emotional skill, a senso-motorical skill, or a social skill.

Figure 3:
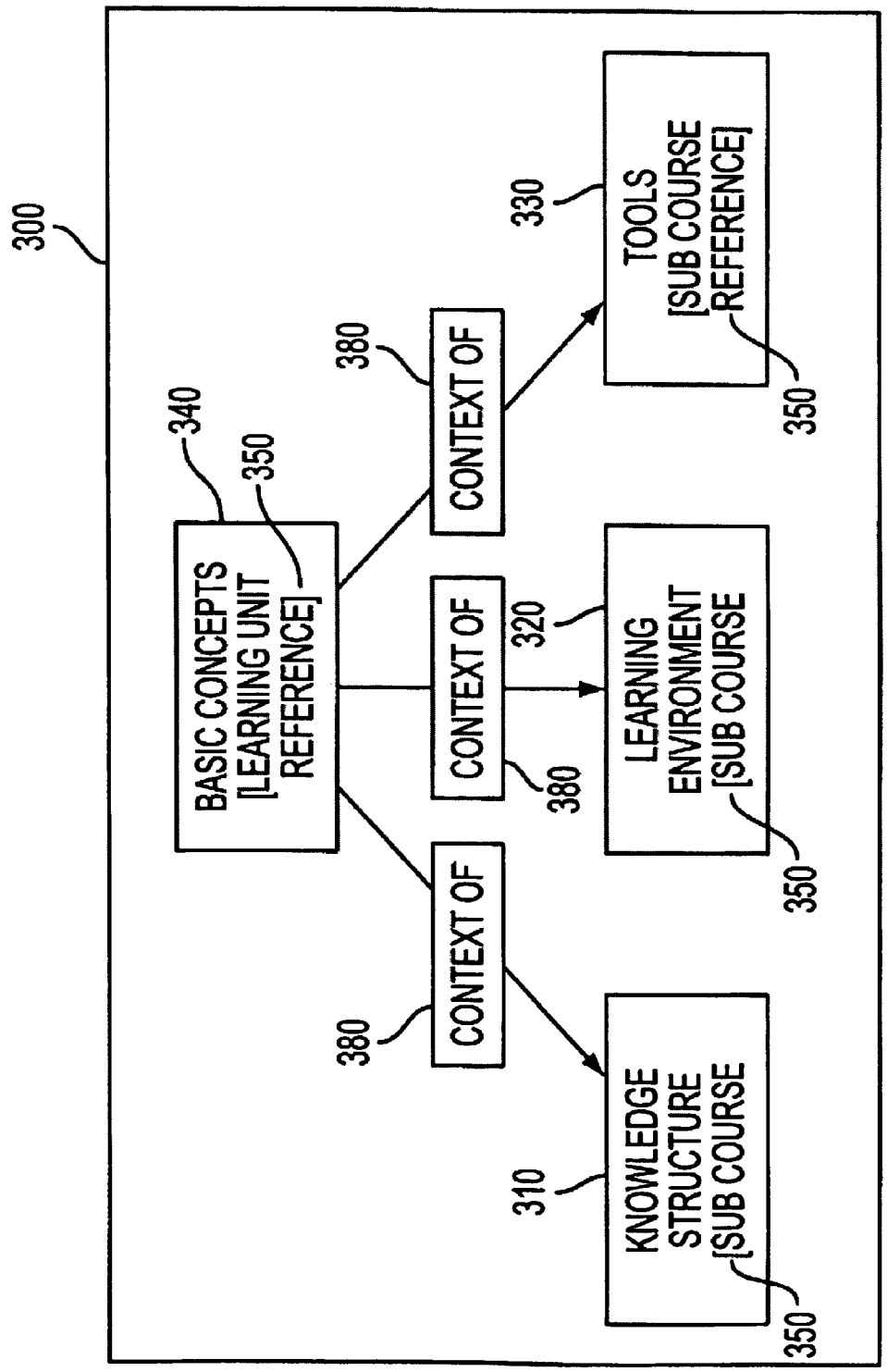
FIG. 3 is an example of a course graph for e-learning.

The content structure associated with a course may be represented as a set of graphs. A structural element may be represented as a node in a graph. Node attributes are used to convey the metadata attached to the corresponding structural element (e.g., a name, a knowledge type, a competency, and/or a media type). A relation between two structural elements may be represented as an edge. For example, FIG. 3 shows a graph 300 for a course. The course is divided into four structural elements or nodes (310, 320, 330, and 340): three sub-courses (e.g., knowledge structure, learning environment, and tools) and one learning unit (e.g., basic concepts). A node attribute 350 of each node is shown in brackets (e.g., the node labelled "Basic concepts" has an attribute that identifies it as a reference to a learning unit). In addition, an edge 380 expressing the relation "context of" has been specified for the learning unit with respect to each of the sub-courses. As a result, the basic concepts explained in the learning unit provide the context for the concepts covered in the three sub-courses.

Figure 4:
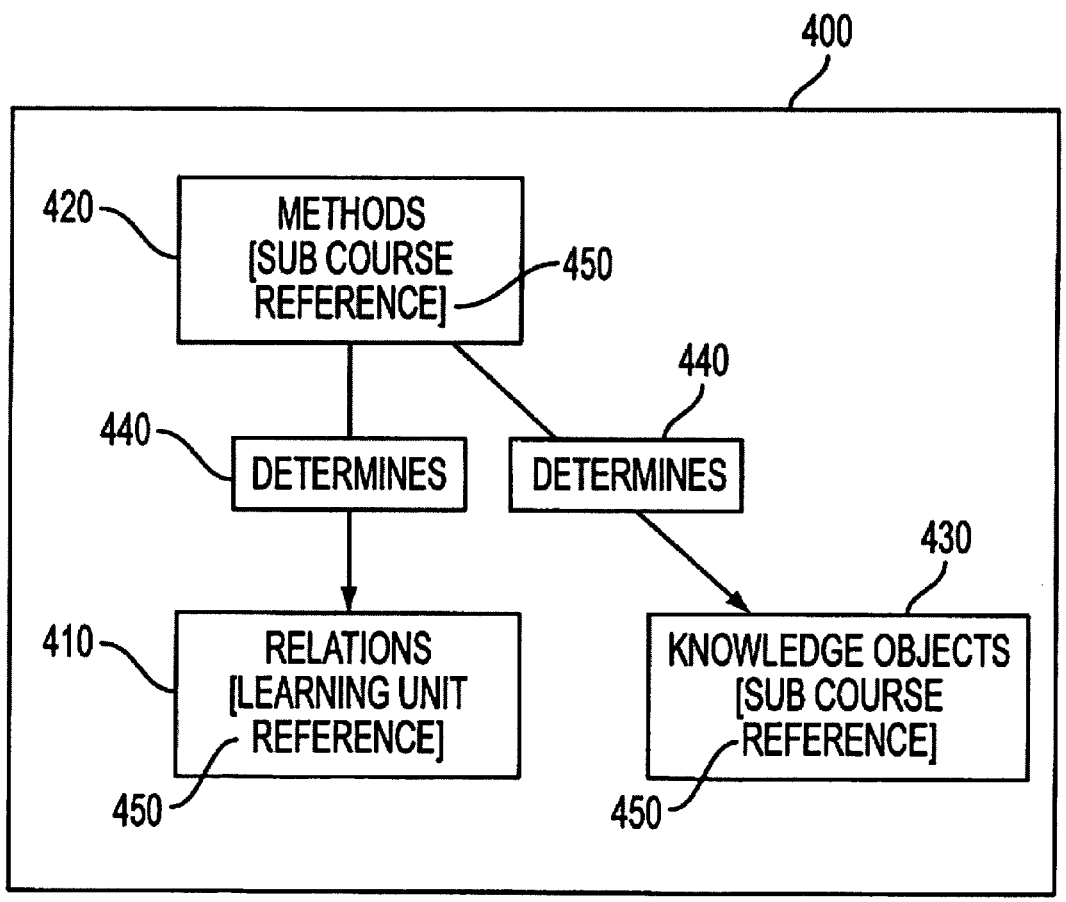
FIG. 4 is an example of a sub-course graph for e-learning.

FIG. 4 shows a graph 400 of the sub-course "Knowledge structure" 350 of FIG. 3. In this example, the sub-course "Knowledge structure" is further divided into three nodes (410, 420, and 430): a learning unit (e.g., on relations) and two sub-courses (e.g., covering the topics of methods and knowledge objects). The edge 440 expressing the relation "determines" has been provided between the structural elements (e.g., the sub-course "Methods" determines the sub-course "Knowledge objects" and the learning unit "Relations.") In addition, the attribute 450 of each node is shown in brackets (e.g., nodes "Methods" and "Knowledge objects" have the attribute identifying them as references to other sub-courses; node "Relations" has the attribute of being a reference to a learning unit).

Figure 5:
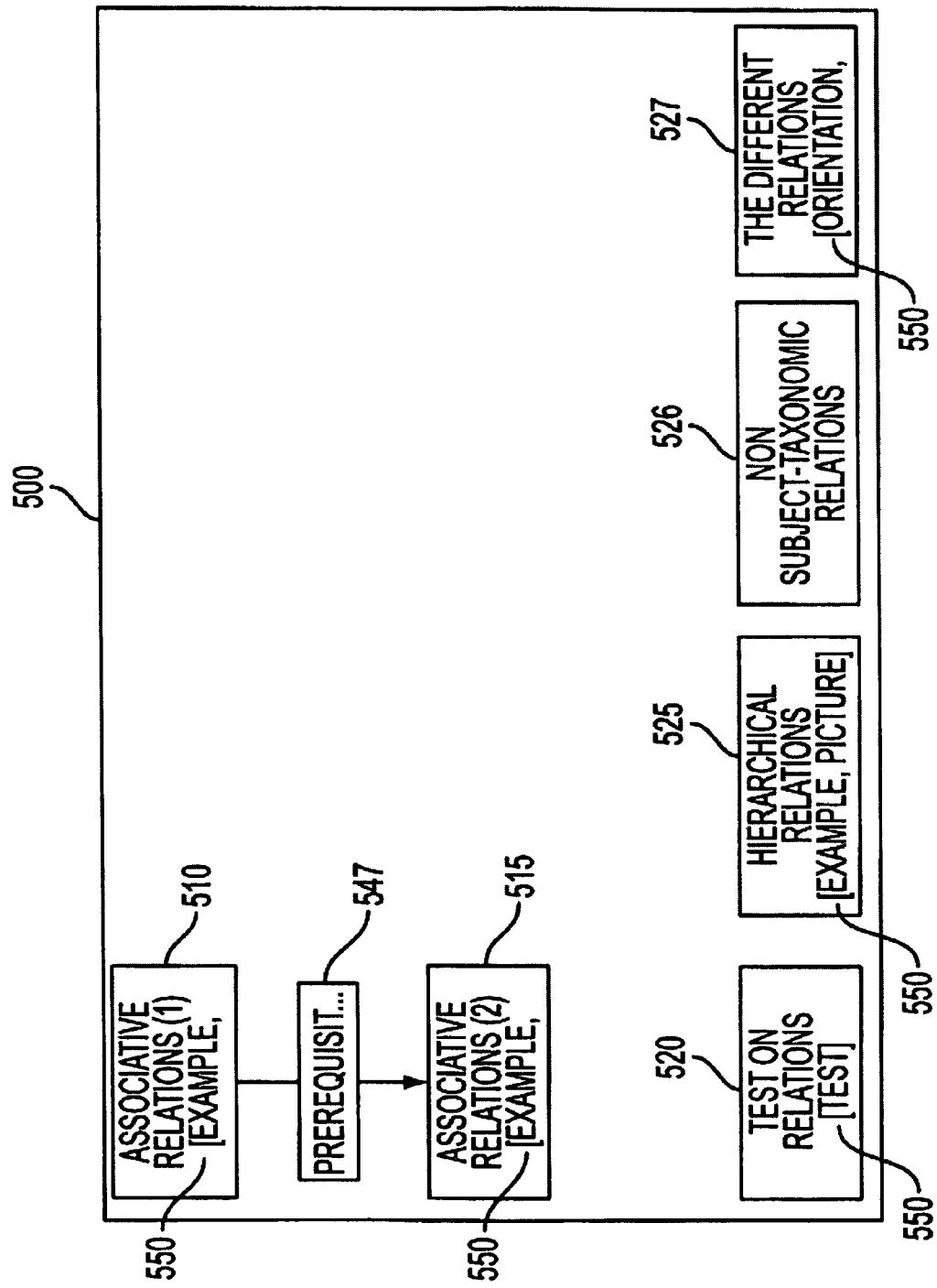
FIG. 5 is an example of a learning unit graph for e-learning.

FIG. 5 shows a graph 500 for the learning unit "Relations" 450 shown in FIG. 4. The learning unit includes six nodes (510, 515, 520, 525, 530, 535, 540, and 545): six knowledge items (i.e., "Associative relations (1)," "Associative relations (2)," "Test on relations," "Hierarchical relations," "Non subject-taxonomic relations," and "The different relations"). An edge 547 expressing the relation "prerequisite" has been provided between the knowledge items "Associative relations (1)" and "Associative relations (2)." In addition, attributes 550 of each node are specified in brackets (e.g., the node "Hierarchical relations" includes the attributes "Example" and "Picture").

The above-described content aggregation and structure associated with a course does not automatically enforce any sequence that a learner may use to traverse the content associated with the course. As a result, different sequencing rules may be applied to the same course structure to provide different paths through the course. The sequencing rules applied to the knowledge structure of a course are learning strategies. The learning strategies may be used to pick specific structural elements to be suggested to the learner as the learner progresses through the course. The learner or supervisor (e.g., a tutor) may select from a number of different learning strategies while taking a course. For example, the learner or the supervisor may perform a search of knowledge items contained in a repository by inputting a search query containing keywords. The search results are generated by matching the keyword query terms with keyword metadata associated with knowledge items. In turn, the selected learning strategy considers both the requirements of the course structure and the preferences of the learner.

In the classical classroom, a teacher determines the learning strategy that is used to learn course material. For example, in this context the learning progression may start with a course orientation, followed by an explanation (with examples), an action, and practice. Using the e-learning system and methods, a learner may choose between one or more learning strategies to determine which path to take through the course. As a result, the progression of learners through the course may differ.

Learning strategies may be created using macro-strategies and micro-strategies. A learner may select from a number of different learning strategies when taking a course. The learning strategies are selected at run time of the presentation of course content to the learner (and not during the design of the knowledge structure of the course). As result, course authors are relieved from the burden of determining a sequence or an order of presentation of the course material. Instead, course authors may focus on structuring and annotating the course material. In addition, authors are not required to apply complex rules or Boolean expressions to domain models thus minimizing the training necessary to use the system. Furthermore, the course material may be easily adapted and reused to edit and create new courses.

Macro-strategies are used in learning strategies to refer to the coarse-grained structure of a course (i.e., the organization of sub-courses 120 and learning units 130). The macro-strategy determines the sequence that sub-courses 120 and learning units 130 of a course are presented to the learner. Basic macro-strategies include "inductive" and "deductive," which allow the learner to work through the course from the general to the specific or the specific to the general, respectively. Other examples of macro-strategies include "goal-based, top-down," "goal-based, bottom-up," and "table of contents."

Goal-based, top-down follows a deductive approach. The structural hierarchies are traversed from top to bottom. Relations within one structural element are ignored if the relation does not specify a hierarchical dependency. Goal-based bottom-up follows an inductive approach by doing a depth first traversal of the course material. The table of contents simply ignores all relations.

Micro-strategies, implemented by the learning strategies, target the learning progression within a learning unit. The micro-strategies determine the order that knowledge items of a learning unit are presented. Micro-strategies refer to the attributes describing the knowledge items. Examples of micro-strategies include "orientation only," "action oriented," "explanation-oriented," and "table of contents").

The micro-strategy "orientation only" ignores all knowledge items that are not classified as orientation knowledge. The "orientation only" strategy may be best suited to implement an overview of the course. The micro-strategy "action oriented" first picks knowledge items that are classified as action knowledge. All other knowledge items are sorted in their natural order (i.e., as they appear in the knowledge structure of the learning unit). The micro-strategy "explanation oriented" is similar to action oriented and focuses on explanation knowledge. Orientation oriented is similar to action oriented and focuses on orientation knowledge. The micro-strategy "table of contents" operates like the macro-strategy table of contents (but on a learning unit level).

In one implementation, no dependencies between macro-strategies and micro-strategies exist. Therefore, any combination of macro and micro-strategies may be used when taking a course. Application of learning strategies to the knowledge structure of a course is described in further detail below.

Figure 6:
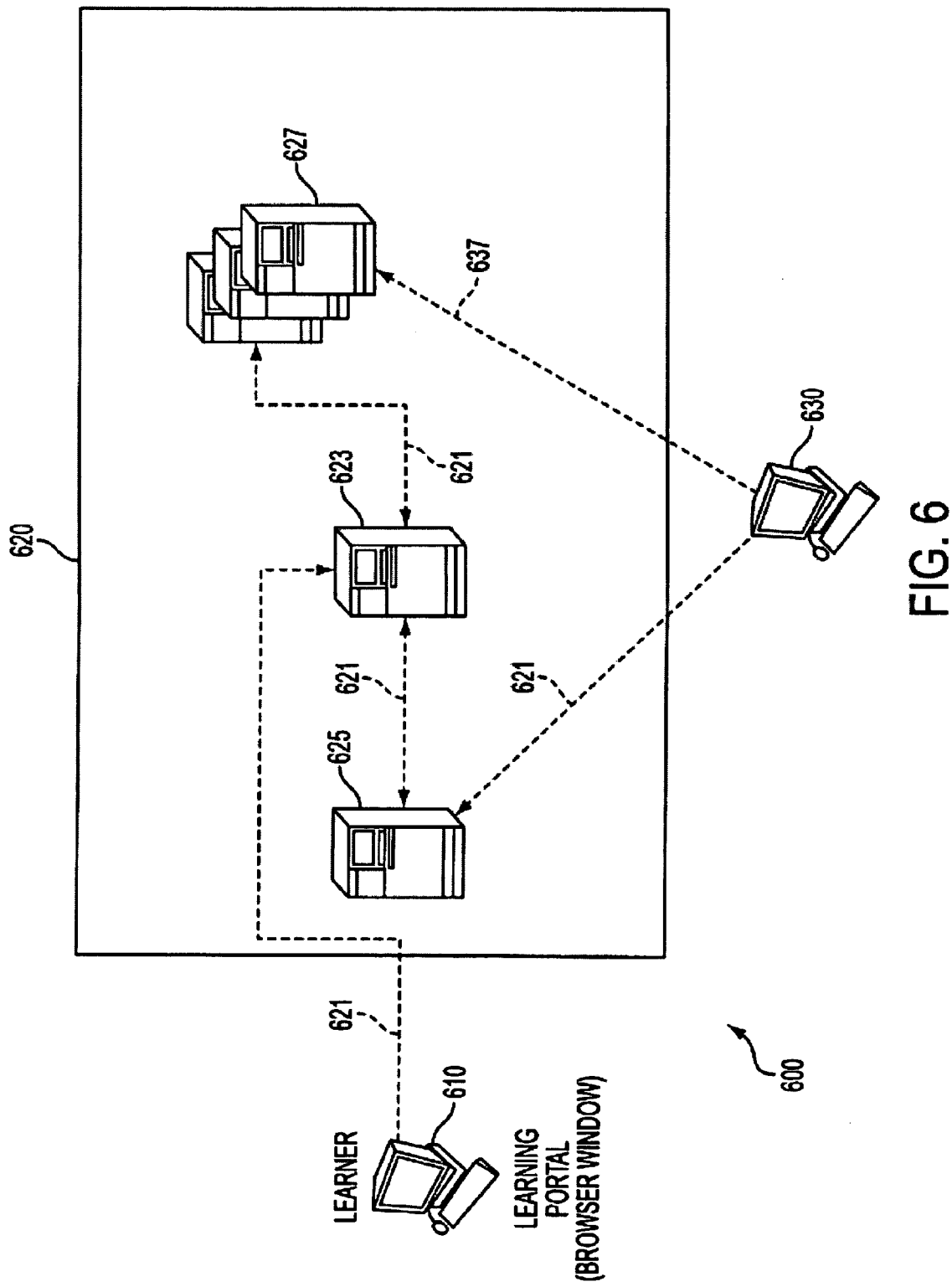
FIG. 6 is a block diagram of an exemplary e-learning system.

As shown in FIG. 6, an e-learning architecture 600 may include a learning station 610 and a learning system 620. The learner may access course material using a learning station 610. The learning station 610 may be implemented using any general purpose computer that is capable of executing instructions in a defined manner including: a special purpose computer, a personal computer, a work station, a programmable logic device or a portable computing device. The learning station 610 may execute any number of software applications, including an application that is configured to access, interpret, and present courses and related information to a learner.

The learning station 610 may include a browser to connect with a learning portal that allows a learner to access the learning system 620. A link 621 between the learning station and the learning system 620 may be configured to send and receive signals (e.g., electrical, electromagnetic, or optical) that convey or carry data streams representing various types of analog and/or digital content. For example, the communications link 621 may be implemented using a plain old telephone service (POTS) line network, a digital user line (DSL) network, an integrated services digital network (ISDN), and a synchronous optical network (SONET), or combinations of one or more of these networks. In addition, the communications links may include a wireless link using electromagnetic signals, such as, for example, radio, infrared, and microwave signals, to convey information. The communications link 621 also may include two or more networks or network devices (e.g., servers, routers, switches, hubs, repeaters, and storage devices).

The learning system 620 may include one or more servers. As shown in FIG. 6, the learning system 620 includes a learning management system 623, a content management system 625, and an administration management system 627. Each of these systems may be implemented using one or more servers, processors, or intelligent network devices. In addition, an authoring station 630 may be provided to create courses from structural elements.

A number of implementations have been described. Nevertheless, it will be understood that various modifications may be made. For example, advantageous results may be achieved if the steps of the disclosed techniques are performed in a different order and/or if components in a disclosed system, architecture, device, or circuit are combined in a different manner and/or replaced or supplemented by other components.

Elements of different implementations may be combined to form another implementation not specifically set forth above. Other implementations not specifically described herein are also within the scope of the following claims.

What is claimed is:

1. A method that is computer-implemented, the method comprising:
   obtaining sets of parameters comprising weights associated with actions to change one or more characters in first words to generate predicted keywords, the weights also being associated with locations of the first words within a set of metadata;
   using the sets of parameters to obtain predicted keywords from the first words;
   determining a prediction value for each set of parameters, the prediction values being based on at least one of a precision value and a recall value, the precision value including a number of predicted keywords that are also in a predefined keyword vocabulary relative to a total number of predicted keywords, and the recall value including a number of keywords in the predefined keyword vocabulary that are also in the predicted keywords relative to a total number of keywords in the predefined keyword vocabulary;
   ranking the sets of parameters based on prediction values, wherein the ranking results in ranks that are stored in memory;
   applying a selected set of parameters to a second word to obtain a new keyword, wherein the selected set of parameters that is applied is applied in order of rank;
   receiving feedback indicating whether the new keyword is acceptable; and
   if the new keyword is not acceptable, applying another set of parameters, in order of rank, to the second word to obtain an additional keyword.

2. The method of claim 1, wherein the selected set of parameters has a prediction value that indicates a best match between predicted keywords and predefined keywords.

3. The method of claim 2, wherein the other set of parameters has a prediction value that indicates a next best match between predicted keywords and predefined keywords.

4. The method of claim 1, wherein the weights comprise costs assigned to actions required to change the first words into the predicted keywords, the actions comprising character transitions that comprise the actions to change one or more characters at different positions.

5. The method of claim 4, wherein the character transitions comprise one or more of:
   deleting an end position character, deleting a middle position character, deleting a beginning position character, editing the end position character, editing a middle position character, editing the beginning position character, inserting the end position character, inserting a middle position character, and inserting the beginning position character; and
   wherein the end position comprises a last character position in the first word, the beginning position comprises a first character position in the first word, and a middle position comprises a position in the first word between the end position and the beginning position.

6. The method of claim 1, wherein a weight for a set of parameters is based on whether a first word is part of a title of data or a body of the data.

7. The method of claim 1, wherein the new keyword is part of metadata for a learning object, the learning object being stored in a repository that is part of an electronic learning system.

8. The method of claim 1, wherein the prediction value is determined for plural predicted keywords, the plural predicted keywords corresponding to keywords that are related to the first word hierarchically.

9. The method of claim 1, further comprising:
storing the new keyword as metadata for a data object;
receiving a search query; and
returning information relating to the data object if at least part of the search query matches the new keyword.

10. The method of claim 1, further comprising obtaining the first words by removing stop words from text that includes the first words.

11. The method of claim 2, wherein the feedback is received from a user; and wherein the method further comprises:
receiving feedback indicating whether the additional keyword is acceptable;
if the additional keyword is not acceptable, applying another set of parameters to the second word to obtain a next keyword; and
repeating receiving and applying until an acceptable keyword is obtained.

12. One or more machine-readable media for storing instructions that are executable by one or more processing devices to perform the following actions:
obtaining sets of parameters comprising weights associated with actions to change one or more characters in first words to generate predicted keywords, the weights also being based on locations of the first words within a set of metadata;
using the sets of parameters to obtain predicted keywords from the first words;
determining a prediction value for each set of parameters, the prediction values being based on at least one of a precision value and a recall value, the precision value including a number of predicted keywords that are also in a predefined keyword vocabulary relative to a total number of predicted keywords, and the recall value including a number of keywords in the predefined keyword vocabulary that are also in the predicted keywords relative to a total number of keywords in the predefined keyword vocabulary;
ranking the sets of parameters based on prediction values;
applying a selected set of parameters to a second word to obtain a new keyword, wherein the selected set of parameters that is applied is applied in order of rank;
receiving feedback indicating whether the new keyword is acceptable; and
if the new keyword is not acceptable, applying another set of parameters, in order of rank, to the second word to obtain an additional keyword.

13. The one or more machine-readable media of claim 12, wherein the selected set of parameters has a prediction value that indicates a best match between predicted keywords and predefined keywords.

14. The one or more machine-readable media of claim 13, wherein the other set of parameters has a prediction value that indicates a next best match between predicted keywords and predefined keywords.

15. The one or more machine-readable media of claim 12, wherein the weights comprise costs assigned to actions required to change the first words into the predicted keywords, the actions comprising character transitions that comprise the actions to change one or more characters at different positions.

16. The one or more machine-readable media of claim 15, wherein the character transitions comprise one or more of:
deleting an end position character, deleting a middle position character, deleting a beginning position character, editing the end position character, editing a middle position character, editing the beginning position character, inserting the end position character, inserting a middle position character, and inserting the beginning position character; and
wherein the end position comprises a last character position in the first word, the beginning position comprises a first character position in the first word, and a middle position comprises a position in the first word between the end position and the beginning position.

17. The one or more machine-readable media of claim 12, wherein a weight for a set of parameters is based on whether a first word is part of a title of data or a body of the data.

18. The one or more machine-readable media of claim 12, wherein the new keyword is part of metadata for a learning object, the learning object being stored in a repository that is part of an electronic learning system.

19. The one or more machine-readable media of claim 12, wherein the prediction value is determined for plural predicted keywords, the plural predicted keywords corresponding to keywords that are related to the first word hierarchically.

20. The one or more machine-readable media of claim 12, further comprising instructions that are executable by one or more processing devices to perform the following actions:
storing the new keyword as metadata for a data object;
receiving a search query; and
returning information relating to the data object if at least part of the search query matches the new keyword.

* * * * *